United States Patent
Zhang et al.

(10) Patent No.: US 10,688,668 B2
(45) Date of Patent: Jun. 23, 2020

(54) PALM-TYPE MECHANICAL GRIPPER WITH VARIABLE-POSITION AND ROTATABLE FINGERS AND CRANK-ROCKER-SLIDER PARALLEL MECHANISM

(71) Applicant: Jiangnan University, Wuxi (CN)

(72) Inventors: Jun Zhang, Wuxi (CN); Jian Shen, Wuxi (CN); Bin Lv, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 181 days.

(21) Appl. No.: 16/072,186

(22) PCT Filed: Dec. 8, 2017

(86) PCT No.: PCT/CN2017/115206
§ 371 (c)(1),
(2) Date: Jul. 24, 2018

(87) PCT Pub. No.: WO2018/196388
PCT Pub. Date: Nov. 1, 2018

(65) Prior Publication Data
US 2020/0016769 A1 Jan. 16, 2020

(30) Foreign Application Priority Data

Apr. 26, 2017 (CN) .......................... 2017 1 0282030

(51) Int. Cl.
*B25J 15/00* (2006.01)
(52) U.S. Cl.
CPC ................. *B25J 15/0009* (2013.01)

(58) Field of Classification Search
CPC ...... B25J 15/0009; B25J 15/10; B25J 15/086; Y10S 901/38; Y10S 901/39
See application file for complete search history.

(56) References Cited

U.S. PATENT DOCUMENTS 5,447,403 A 9/1995 Engler, Jr.
5,647,723 A * 7/1997 Rush ...................... B25J 9/1085
294/111

(Continued)

FOREIGN PATENT DOCUMENTS

CN 201394835 Y 2/2010
CN 103317521 A 9/2013
(Continued)

*Primary Examiner* — Stephen A Vu
(74) *Attorney, Agent, or Firm* — Bayramoglu Law Offices LLC (57) ABSTRACT

A palm-type mechanical gripper with variable-position and rotatable fingers and a crank-rocker-slider parallel mechanism adopts crank-rocker-slider mechanisms and three identical flexible plate spring fingers, wherein one finger is fixed, and the other two fingers can rotate and move to achieve translational motions and are respectively and symmetrically installed on connecting rods or rockers on left and right sides. The crank-rocker-slider mechanism on the left side is an active driving structure and is driven by two stepping motors to respectively generate angular displacement of cranks and linear movement of sliders. The crank-rocker-slider mechanism on the right side is a driven mechanism and is driven at a constant speed by a pair of gears. The eccentricities of the cranks, the positions and angles of the two fingers respectively on the two connecting rods or rockers and the position of the other fixed finger can be changed through manual adjustment.

1 Claim, 4 Drawing Sheets

(56) References Cited

U.S. PATENT DOCUMENTS

| | | | | |
|---|---|---|---|---|
| 2006/0012198 | A1* | 1/2006 | Hager | B25J 9/1612 |
| | | | | 294/106 |
| 2007/0035143 | A1* | 2/2007 | Blackwell | B25J 9/104 |
| | | | | 294/111 |
| 2008/0019803 | A1* | 1/2008 | Dai | B25J 15/0009 |
| | | | | 414/4 |
| 2013/0226350 | A1* | 8/2013 | Bergelin | A61B 5/6806 |
| | | | | 700/275 |

FOREIGN PATENT DOCUMENTS

| | | |
|---|---|---|
| CN | 103386691 A | 11/2013 |
| CN | 204277999 U | 4/2015 |
| CN | 106926265 A | 7/2017 |
| JP | 2009291853 A | 12/2009 |

\* cited by examiner

B-B unfolding

PALM-TYPE MECHANICAL GRIPPER WITH VARIABLE-POSITION AND ROTATABLE FINGERS AND CRANK-ROCKER-SLIDER PARALLEL MECHANISM

CROSS REFERENCE TO RELATED APPLICATIONS

This application is the national phase entry of International Application PCT/CN2017/115206, filed on Dec. 8, 2017, which is based upon and claims priority to Chinese Patent Application No. CN201710282030.X, filed on Apr. 26, 2017, the entire contents of which are incorporated herein by reference.

TECHNICAL FIELD

The invention provides a palm-type mechanical gripper with variable-position and rotatable fingers and a dual-drive crank-rocker-slider parallel mechanism, having the advantages of large operation space, high adaptability, low energy consumption and the like and belonging to the fields of logistics transportation equipment, mechanical grippers and robots.

BACKGROUND

At present, except high-cost human-simulated manipulators provided with a plurality of sensors, common mechanical grippers either can only grasp round or spherical objects with different diameters by controlling center distances of fingers or can only grasp rectangular objects by controlling the fingers to rotate. Mechanical grippers with variable-position and rotatable fingers are not available yet.

SUMMARY

In order to overcome the aforesaid defects, the invention provides a mechanical gripper, which is designed in the aspect of changing the palm shape and adopts the simplest crank-rocker-slider mechanisms based on the characteristic of a large acting space of the parallel mechanism. Three identical flexible plate spring fingers are adopted, wherein one finger is fixed, and the other two fingers are capable of both rotating and moving to achieve translational motions. A crank-rocker-slider mechanism on the left side is an active driving structure and is driven by two stepping motors to respectively generate angular displacement of cranks and linear movement of sliders. A crank-rocker-slider mechanism on the right side is a driven mechanism and is driven at a constant speed by a pair of gears. The rotational angular displacement of the crank on the left side is equal to that of the crank on the right side. The mechanical gripper is provided with three plate spring fingers, wherein two fingers are respectively installed connecting rods or rockers on the left side and the right side, and under the cooperative control of the two stepping motors, the eccentricities of the cranks, the positions and angles of the two fingers respectively on the two connecting rods or the two rockers and the position of the other fixed finger can be changed through manual adjustment. The mechanical gripper of the invention is driven to generate a clamping and grasping force by the two stepping motors, which can be powered off in the grasping process based on the self-locking property. The mechanical gripper of the invention has the advantages of large operation space, high adaptability, low energy consumption and the like, belonging to the fields of logistics transportation equipment, mechanical grippers and robots. The technical solution of the present invention is as follows.

As shown in FIGS. 1-24, a palm-type mechanical gripper with variable-position and rotatable fingers and a crank-rocker-slider parallel mechanism is composed of a base plate 1, guide rail supports 2, a linear guide rail 3, an installation plate 4, a linear bearing 5, a movable base 6, a lead screw nut 7, a lead screw stepping motor 8, a hinge shaft 9, wear washers 10, a driven rocker 11, a driving rocker 12, connecting rods 13, hinge pins 14, a short finger holder 15, plate spring curved fingers 16, grooved cranks 17, a gear cover plate 18, a stepping motor with a worm speed reducer 19, a driving gear 20, a flat key 21, a driving shaft 22, a long sleeve 23, mounted bearings 24, a short sleeve 25, a driven shaft 26, a thick sleeve 27, a taper-hole gear 28, a taper sleeve 29, a flat round nut 30, small mounted bearings 31, guide studs 32, a long finger holder 33, a medium finger holder 34 and thick cushion blocks 35.

Figure 1:
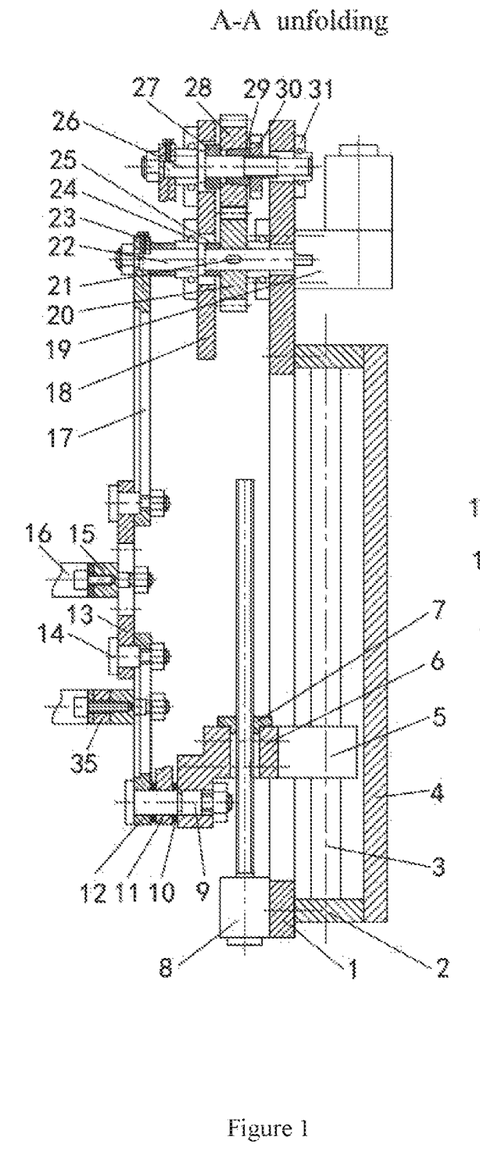
FIG. 1 is an A-A section unfolded view of a palm-type mechanical gripper with a parallel mechanism of the invention.
Figure 2:
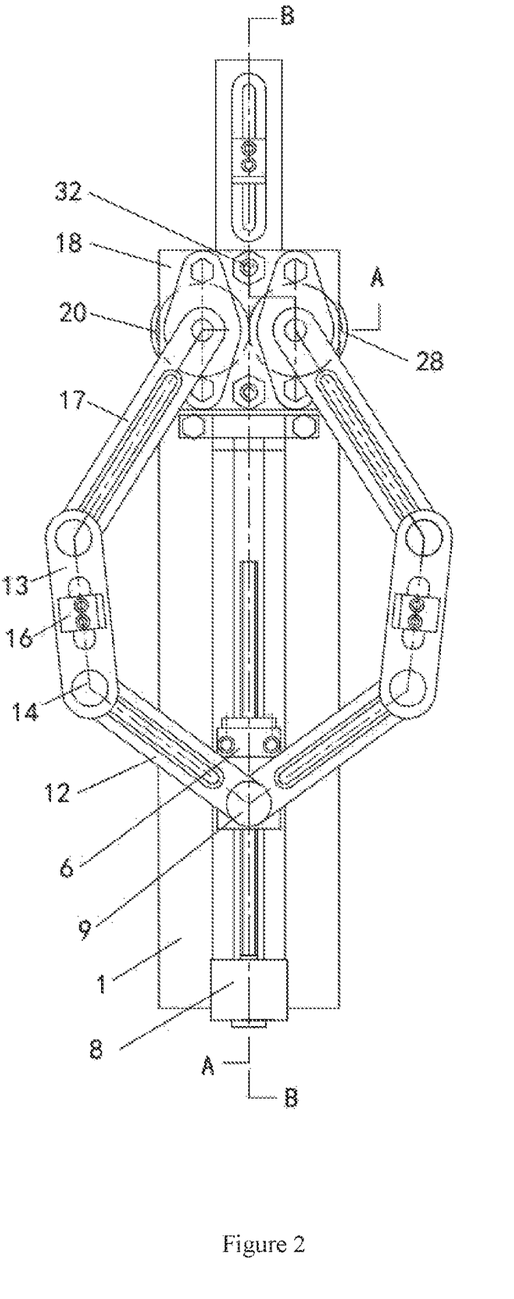
FIG. 2 is a front view of the palm-type mechanical gripper with a parallel mechanism of the invention.
Figures 3, 4:
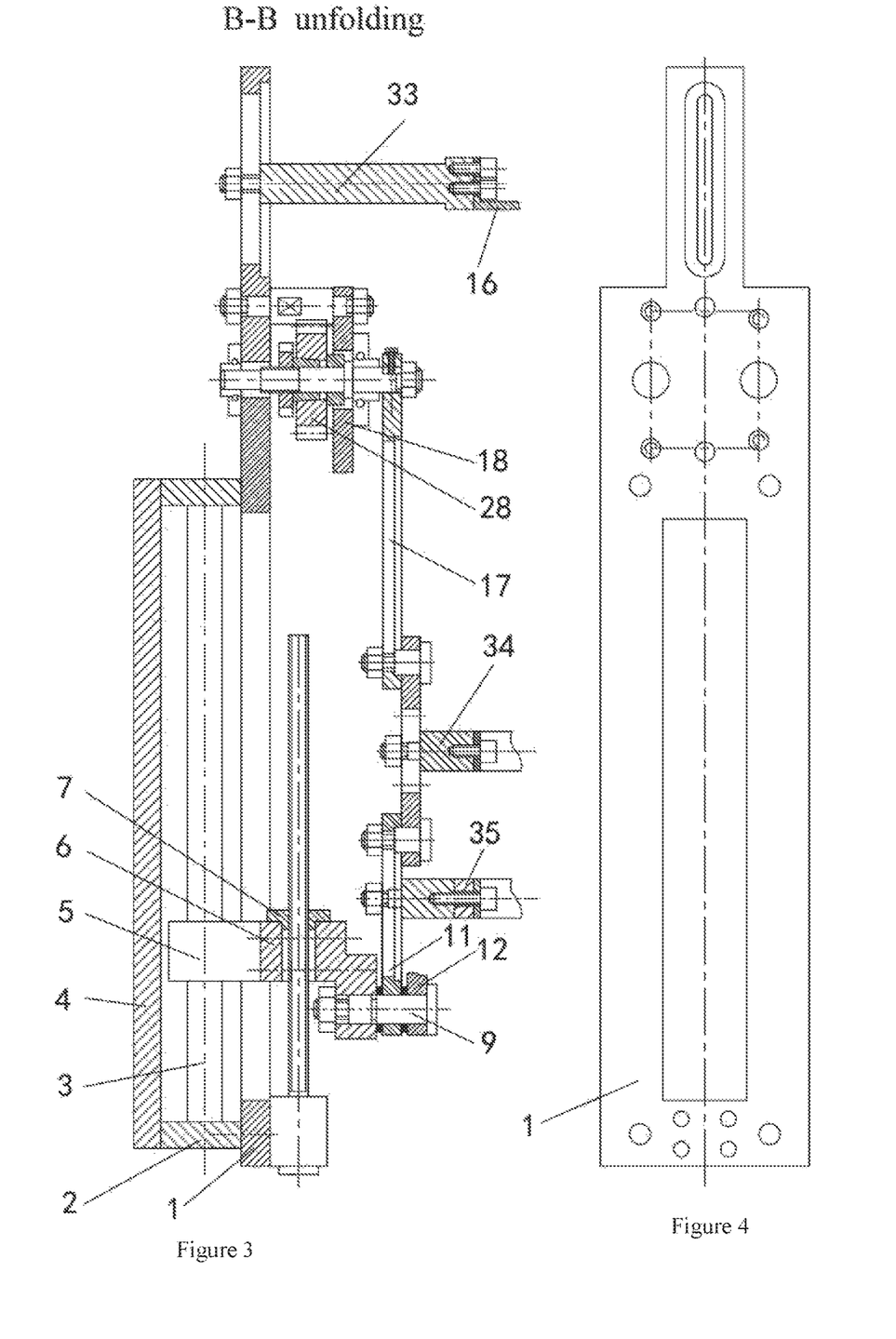
FIG. 3 is a B-B section unfolded view of the palm-type mechanical gripper with a parallel mechanism of the invention.
FIG. 4 is a front view of a base plate of the palm-type mechanical gripper with a parallel mechanism of the invention.
Figures 5, 6, 9:
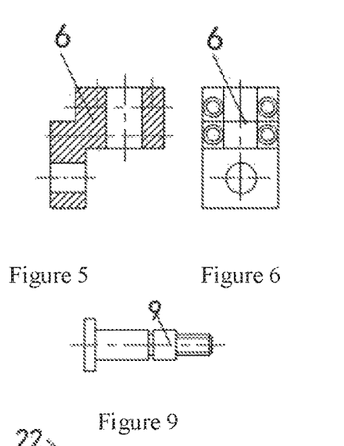
FIG. 5 is a front view of a movable base of the palm-type mechanical gripper with a parallel mechanism of the invention.
FIG. 6 is a left view of the movable base of the palm-type mechanical gripper with a parallel mechanism of the invention.
FIG. 9 is a front view of a hinge shaft of the palm-type mechanical gripper with a parallel mechanism of the invention.
Figures 7, 8, 12, 13, 23, 24:
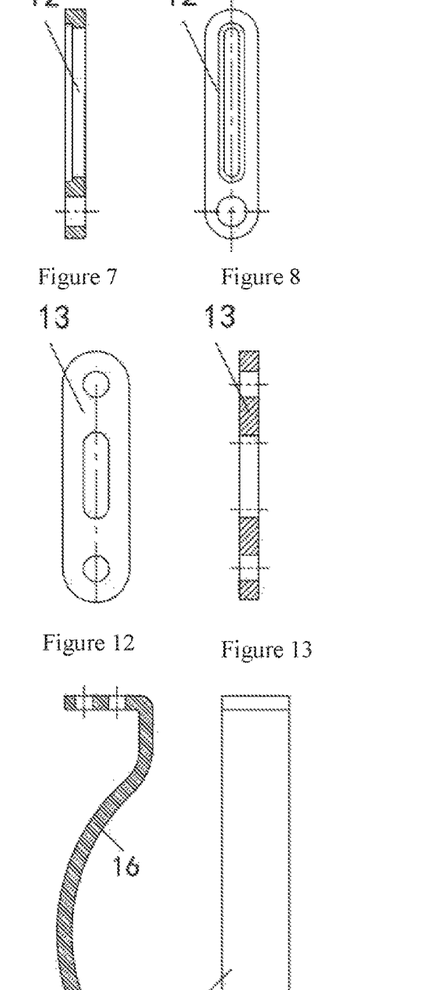
FIG. 7 is a section view of a driving rocker of the palm-type mechanical gripper with a parallel mechanism of the invention.
FIG. 8 is a left view of the driving rocker of the palm-type mechanical gripper with a parallel mechanism of the invention.
FIG. 12 is a front view of a connecting rod of the palm-type mechanical gripper with a parallel mechanism of the invention.
FIG. 13 is a section view of the connecting rod of the palm-type mechanical gripper with a parallel mechanism of the invention.
FIG. 23 is a section view of a plate spring curved finger of the palm-type mechanical gripper with a parallel mechanism of the invention.
FIG. 24 is a right view of the plate spring curved finger of the palm-type mechanical gripper with a parallel mechanism of the invention.
Figure 10:
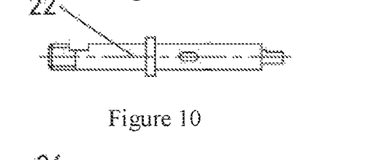
FIG. 10 is a front view of a driving shaft of the palm-type mechanical gripper with a parallel mechanism of the invention.
Figure 11:
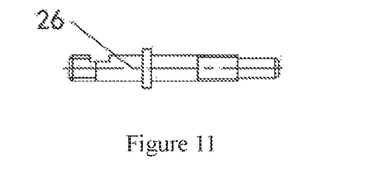
FIG. 11 is a front view of a driven shaft of the palm-type mechanical gripper with a parallel mechanism of the invention.
Figure 14:
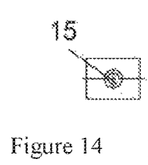
FIG. 14 is a right view of a short finger holder of the palm-type mechanical gripper with a parallel mechanism of the invention.
Figures 15, 16:
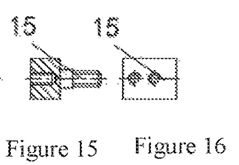
FIG. 15 is a front view of the short finger holder of the palm-type mechanical gripper with a parallel mechanism of the invention.
FIG. 16 is a left view of the short finger holder of the palm-type mechanical gripper with a parallel mechanism of the invention.
Figure 17:
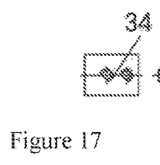
FIG. 17 is a right view of a medium finger holder of the palm-type mechanical gripper with a parallel mechanism of the invention.
Figure 18:
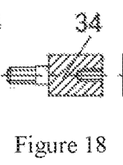
FIG. 18 is a front view of the medium finger holder of the palm-type mechanical gripper with a parallel mechanism of the invention.
Figure 19:
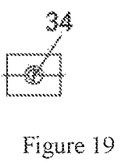
FIG. 19 is a left view of the medium finger holder of the palm-type mechanical gripper with a parallel mechanism of the invention.
Figures 20, 21, 22:
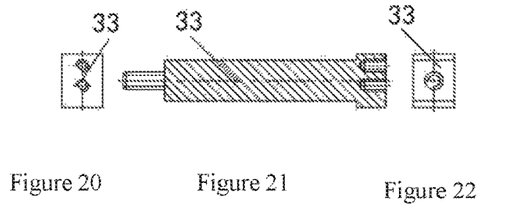
FIG. 20 is a right view of a long finger holder of the palm-type mechanical gripper with a parallel mechanism of the invention.
FIG. 21 is a front view of the long finger holder of the palm-type mechanical gripper with a parallel mechanism of the invention.
FIG. 22 is a left view of the long finger holder of the palm-type mechanical gripper with a parallel mechanism of the invention.

As shown in FIGS. 1-3, as for the palm-type mechanical gripper with the variable-position and rotatable fingers and the crank-rocker-slider parallel mechanism, two ends of the linear guide rail 3 are fixed by the two guide rail supports 2 installed on the base plate 1. Two ends of the installation plate 4 are respectively fixed on the two guide rail supports 2. The installation plate 4 is provided with a series of holes located at different positions and used for connection with a robot body. Sizes of the series of holes correspond to the size of the robot body. The series of holes located at different positions are beneficial to adjustment and connection to adapt to gravity centers of different grasped objects. The linear bearing 5 penetrates through the linear guide rail 3 to move. The movable base 6 is fixed on the linear bearing 5. The hinge shaft 9 is fixed on the movable base 6 with a nut. The lead screw nut 7 is fixed on the movable base 6. The lead screw stepping motor 8 is fixed on the base plate 1 and drives, through the lead screw nut 7, the movable base 6 to drive the linear bearing 5 to linearly move on the linear guide rail 3. The hinge shaft 9 penetrates through holes in the driven rocker 11 and in the driving rocker 12. The wear washers 10 are respectively arranged on the left side and the right side of the driven rocker 11. The driven rocker 11 and the driving rocker 12 rotate on the hinge shaft 9 in opposite directions.

Two layers of kidney-shaped grooves with different widths are coaxially milled on the horizontal face of the driving rocker 12. The driving rocker 12 is connected with the connecting rod 13 on the left side in a hinged manner through the corresponding hinge pin 14. The diameter of a guide cylindrical face of the corresponding hinge pin 14 is in clearance fit with the width of the wide kidney-shaped groove of the driving rocker 12. After being tightened with a nut, the corresponding hinge pin 14 is integrated with the driving rocker 12. The connecting rod on the left side has a thickness clearance and is capable of rotating in the corresponding hinge pin 14 with respect to the driving rocker 12. After the hinge pins 14 are moved and then fixed with nuts, working lengths of the rockers are manually adjusted. The other end of each connecting rod 13 is connected with the corresponding grooved crank 17 in a hinged manner through the corresponding hinge pin 14. Two layers of kidney-shaped grooves with different widths are also coaxially milled on each grooved crank 17. Similar to the connecting principle of the driving rocker 12 and the corresponding connecting rod 13, working eccentricities of the grooved cranks 17 can be manually adjusted.

The other end of the driving grooved crank 17 is sleeved with the driving shaft 22, fastened on the flat face at one end of the driving shaft 22 with a screw and used to transmit the rotation torque of the driving shaft 22. The grooved cranks 17, the long sleeve 23, the two mounted bearings 24, the short sleeve 25 and the driving gear 20 are installed on the driving shaft 22. A flat cylindrical section at the other end of the driving shaft 22 is inserted into a hole of a driving shaft of the stepping motor with the worm speed reducer 19 in a clearance fit manner. The stepping motor with the worm speed reducer 19 transmits the torque to the driving shaft 22 through the flat cylindrical section, and the torque is then transmitted by the flat key 21 on the driving shaft 22 to the driving gear 20. The axial position of the driving gear 20 can be adjusted by regulating axis sizes of the long sleeve 23 and the short sleeve 25. One mounted bearing 24 is fixed on the gear cover plate 18, and an axial gravity generated by the grasped object is transmitted by the shaft shoulder face of the driving shaft 22 to an inner ring of the mounted bearing 24 on the gear cover plate 18 so as to be borne by the inner ring. The other mounted bearing 24, which is coaxial with the mounted bearing 24 on the gear cover plate 18, is fixed on the base plate 1. The gear cover plate 18 and the base plate 1 are connected into an integrated structure through the two guide studs 32. Two ends of each guide stud 32 are provided with cylindrical faces in clearance fit with corresponding holes, and are then fastened with nuts, instead of the guide studs 32 directly having thread connection with the base plate 1 and the gear cover plate 18.

The driven shaft 26 is supported by the mounted bearings 24 and the small mounted bearings 31. The mounted bearings 24 and the small mounted bearings 31 are respectively fixed on the gear cover plate 18 and the base plate 1. In the axial direction, the shaft shoulder face of the driven shaft 26, the thick sleeve 27, the taper-hole gear 28, the taper sleeve 29 and the flat round nut 30 form a rotating body. The driving gear 20 is engaged with the taper-hole gear 28. The taper sleeve 29 is disposed in a hole of the taper-hole gear 28. By tightening the flat round nut 30, the torque is transmitted to the driven shaft 26 under the wedge effect of a conical contact face. The other end of the driven grooved crank 17 is sleeved with the driven shaft 26 and fastened on the flat face at one end of the driven shaft 26 with a screw. The rotation torque of the driven shaft 26 is then transmitted to the driven grooved crank 17. The taper-hole gear 28 and the taper sleeve 29 are separated by reversely unscrewing the flat round nut 30, and then the phase angle between the driving grooved crank 17 and the driven grooved crank 17 is adjusted, namely, the driving grooved crank 17 and the driven grooved crank 17 may be symmetrical or asymmetrical in the horizontal direction.

A kidney-shaped groove is formed in one connecting rod 13 and has a width in clearance fit with the diameter of a section of cylindrical face at the threaded end of the short finger holder 15. The short finger holder 15 can be located at any position of the kidney-shaped groove of the connecting rod 13, can rotate by any angle with respect to the connecting rod 13 and is fixed on the connecting rod 13 with a nut. One plate spring curved finger 16 is installed on the short finger holder 15 and provided with a fingertip curved part used to grasp the object in a pinching manner and a middle curved part used to grasp the object in a wrapping manner.

The width of the long finger holder 33 is in clearance fit with the width of a wide kidney-shaped groove in the base plate 1, and a threaded section of the long finger holder 33 penetrates through a narrow kidney-shaped groove in the base plate 1 and is fixed with a nut so that the position of the long finger holder 33 can be adjusted in the kidney-shaped grooves in the base plate 1. The long finger holder 33 is also provided with one plate spring curved finger 16.

As shown in FIG. 2, the palm-type mechanical gripper with the dual-drive crank-rocker-slider parallel mechanism is provided with a driving crank-rocker-slider mechanism on the left side and a driven crank-rocker-slider mechanism on the right side. The short finger holder 15 is installed on the connecting rod 13 on the left side. The medium finger holder 34 is correspondingly installed on the connecting rod 13 on the right side. The three plate spring curved fingers 16 on the short finger holder 15, the medium finger holder 34 and the long finger holder 33 are completely identical in structure and size. The structure of the mechanical gripper needs to ensure that the planes, where the three plate spring curved fingers 16 are installed, of the short finger holder 15, the medium finger holder 34 and the long finger holder 33 are coplanar.

As shown by double-dotted dash lines in FIGS. 1 and 3, the short finger holder 15 and the medium finger holder 34 can also be respectively installed on the driving rocker 12 and the driven rocker 11. The width of the narrow kidney-shaped groove of the driving rocker 12 is in clearance fit with the diameter of the section of cylindrical face at the threaded end of the short finger holder 15. The short finger holder 15 can be located at any position of the driving rocker 12, can rotate by any angle with respect to the driving rocker 12 and is fixed on the driving rocker 12 with a nut. Correspondingly, the medium finger holder 34 is installed on the driven rocker 11. As the driving connecting rod 13 is higher than the driving rocker 12 in position and the driven connecting rod 13 is higher than the driven rocker 11 in position, after the short finger holder 15 is installed on the driving rocker 12 and the medium finger holder 34 is installed on the driven rocker 11, the installation faces where the plate spring curved fingers 16 are installed need to be supported by the thick cushion blocks 35 to make sure that the planes, where the three plate spring curved fingers 16 are installed, of the short finger holder 15, the medium finger holder 34 and the long finger holder 33 are coplanar.

The lead screw stepping motor 8 is used to control the positions of sliders in the crank-rocker-slider mechanisms and conducts control in cooperation with the stepping motor with the worm speed reducer 19 used to drive the cranks to rotate, so that a dual-drive parallel mechanism is formed. A lead screw nut structure of the lead screw stepping motor 8 and the worm speed reducer of the stepping motor with the worm speed reducer 19 have a self-locking effect so that the two stepping motors can be powered off in the grasping process to save energy. The stepping motor with the worm speed reducer 19 has a higher power than the lead screw stepping motor 8 and is mainly used to drive the clamped object.

① Shape adaptability: based on cooperative driving by the two stepping motors, the mechanical gripper has good shape adaptability to rectangular shape, round shape, elliptic shape, trapezoidal shape and the like.

② Size adaptability: the mechanical gripper is provided with three fingers, the eccentricities of the cranks, the positions and angles of the two fingers respectively on the two connecting rods or rockers and the position of the other fixed finger can be changed through manual adjustment, and thus, the mechanical gripper has good size adaptability.

③ Operation flexibility: when three fingers are used to grasp an object, the line of symmetry of the contact face of the fixed finger is the positioning coordinate origin of the mechanical gripper; and when two movable fingers are used to grasp an object after being manually rotated, the line of symmetry of the two contact faces is the positioning coordinate origin of the mechanical gripper.

④ Grasping agility: the lead screw stepping motor for driving the sliders to move is mainly used for positioning, the stepping motor with the worm speed reducer for driving the cranks to rotate is mainly used for grasping, and thus, the cranks can annularly rotate rapidly.

⑤ Energy saving in service: during rotation of the cranks, the speed reducer of the worm-gear mechanism is used for self-locking, during linear movement of the sliders, the lead screw nut mechanism is used for self-locking, and thus, the two driving stepping motors can be powered off in the grasping process.

In the figures: 1, base plate; 2, guide rail support; 3, linear guide rail; 4, installation plate; 5, linear bearing; 6, movable base; 7, lead screw nut; 8, lead screw stepping motor; 9, hinge shaft; 10, wear washer; 11, driven rocker; 12, driving rocker; 13, connecting rod; 14, hinge pin; 15, short finger holder; 16, plate spring curved finger; 17, grooved crank; 18, gear cover plate; 19, stepping motor with worm speed reducer; 20, driving gear; 21, flat key; 22, driving shaft; 23, long sleeve; 24, mounted bearing; 25, short sleeve; 26, driven shaft; 27, thick sleeve; 28, taper-hole gear; 29, taper sleeve; 30, flat round nut; 31, small mounted bearing; 32, guide stud; 33, long finger holder; 34, medium finger holder; 35, thick cushion block.

DETAILED DESCRIPTION

In the implementation process of the palm-type mechanical gripper with the position-variable and rotatable fingers and the crank-rocker-slider parallel mechanism of the invention, on the one hand, the lead screw stepping motor 8 and the stepping motor with the worm speed reducer 19 conduct control cooperatively for grasping objects; and on the other hand, total seven manual adjustment approaches can be adopted to change (1) the eccentricities of the cranks, (2) the degree of asymmetry of the left crank and the right crank with respect to the axis of the linear guide rail 3, (3) the positions of the two fingers respectively on the left connecting rod and the right connecting rod, (4) the angles of the two fingers respectively on the left connecting rod and the right connecting rod, (5) the positions of the two fingers respectively on the left rocker and the right rocker, (6) the angles of the two fingers respectively on the left rocker and the right rocker, and (7) the position of the other fixed finger, wherein the seven manual adjustment approaches can be adopted independently or in any combination to change the aforesaid parameters, thus, forming specific embodiments. A part of these embodiments are illustrated as follows.

Figure 25:
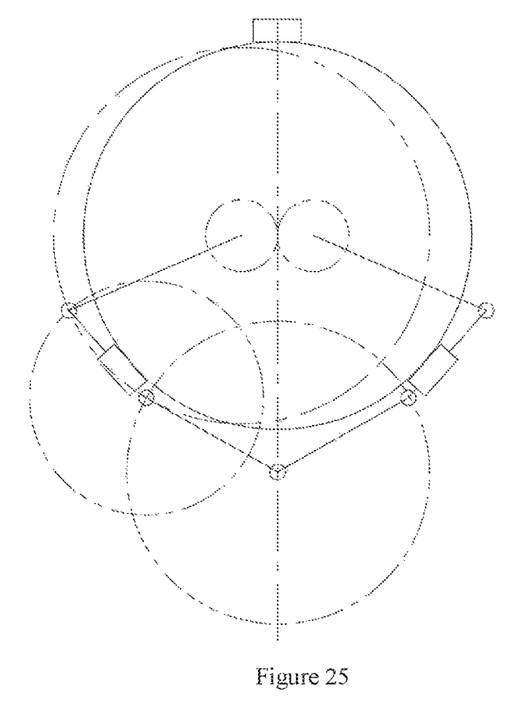
FIG. 25 is a simplified schematic diagram of the palm-type mechanical gripper with a parallel mechanism in the status of grasping a round object by two fingers installed on connecting rods of the invention.

Embodiment 1: as shown in FIG. 25 which is a simplified schematic diagram of the mechanical gripper in the status of grasping a round object, the short finger holder 15 and the medium finger holder 34 are respectively installed on the left connecting rod and the right connecting rod, and after the plate spring curved finger 16 are installed on the short finger holder 15, the medium finger holder 34 and the long finger holder 33, the round object is grasped by the three fingers.

Figure 26:
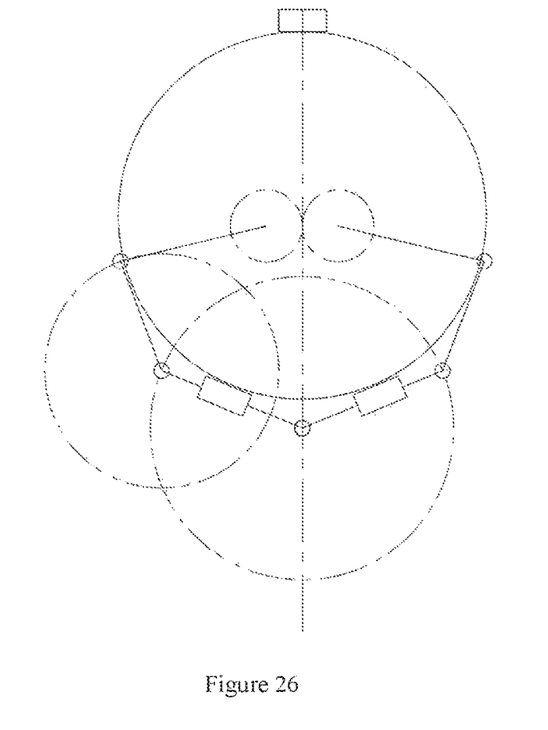
FIG. 26 is a simplified schematic diagram of the palm-type mechanical gripper with a parallel mechanism in the status of grasping a round object by two fingers installed on rockers of the invention.

Embodiment 2: as shown in FIG. 26 which is simplified schematic diagram of the mechanical gripper in the status of grasping a round object, the short finger holder 15 and medium finger holder 34 are respectively installed on the left rocker and the right rocker, and after the plate spring curved fingers 16 are installed on the short finger holder 15, the medium finger holder 34 and the long finger holder 33, the round object is grasped by the three fingers.

The above description is used for explaining the invention instead of being used for limiting the invention. The scope defined by the invention depends on the claims. It would appreciate that all other improvements and changes directly educed or worked out by those skilled in this field without deviating from the basic concept of the invention should fall within the protection scope of the invention.

What is claimed is:

1. A shape adjustable mechanical gripper with variable-position and rotatable fingers and a crank-rocker-slider parallel mechanism, wherein two ends of a linear guide rail are fixed by two guide rail supports installed on a base plate, two ends of an installation plate are respectively fixed on the two guide rail supports, the installation plate is provided with a series of holes located at different positions and used for a connection with a robot body, sizes of the series of holes correspond to a size of the robot body, and the series of holes located at different positions are beneficial to adjustment and connection;

a linear bearing penetrates through the linear guide rail to move, a movable base is fixed on the linear bearing, and a hinge shaft is fixed on the movable base with a first nut;

a lead screw nut is fixed on the movable base, and a lead screw stepping motor is fixed on the base plate and drives, through the lead screw nut, the movable base to drive the linear bearing to linearly move on the linear guide rail;

the hinge shaft penetrates through holes in a driven rocker and in a driving rocker, wear washers are respectively arranged on a left side and a right side of the driven rocker, and the driven rocker and the driving rocker rotate on the hinge shaft in opposite directions;

two layers of kidney-shaped grooves with different widths are coaxially milled on a horizontal face of the driving rocker, the driving rocker is connected with a connecting rod on a left side in a hinged manner through a hinge pin, a guide cylindrical face of the hinge pin has a diameter in clearance fit with a width of a wide kidney-shaped groove of the driving rocker, and after being tightened with a second nut, the hinge pin is integrated with the driving rocker;

the connecting rod has a thickness clearance and is capable of rotating in the hinge pin with respect to the driving rocker;

after the hinge pin is moved and then fixed with the second nut, a working length of the driving rocker is manually adjusted;

an end of the connecting rod is connected with a grooved crank in a hinged manner through a hinge pin, two layers of kidney-shaped grooves with different widths are also coaxially milled on the grooved crank, and similar to a connecting principle of the driving rocker and the connecting rod, a working eccentricity of the grooved crank is manually adjusted;

one end of a driving grooved crank is sleeved with a driving shaft, fastened on a flat face at one end of the driving shaft with a screw and used to transmit rotation torque of the driving shaft;

the grooved crank, a long sleeve, two mounted bearings, a short sleeve and a driving gear are installed on the driving shaft, a flat cylindrical section at an end of the driving shaft is inserted into a hole of a driving shaft of a stepping motor with the worm speed reducer in a clearance fit manner, the stepping motor with the worm speed reducer transmits torque to the driving shaft through the flat cylindrical section, and the torque is then transmitted by a flat key on the driving shaft to the driving gear;

an axial position of the driving gear is adjusted by regulating axis sizes of the long sleeve and the short sleeve;

a first mounted bearing is fixed on a gear cover plate, and an axial gravity generated by a grasped object is transmitted by a shaft shoulder face of the driving shaft to an inner ring of the first mounted bearing on the gear cover plate so as to be borne by the inner ring;

a second mounted bearing coaxial with the mounted bearing on the gear cover plate is fixed on the base plate;

the gear cover plate and the base plate are connected into an integrated structure through two guide studs, and two ends of each guide stud are provided with cylindrical faces in clearance fit with corresponding holes, and are then fastened with nuts, instead of the guide studs directly having thread connection with the base plate and the gear cover plate;

a driven shaft is supported by the two mounted bearings and a small mounted bearing, the two mounted bearings and the small mounted bearings are respectively fixed on the gear cover plate and the base plate, and in an axial direction, a shaft shoulder face of the driven shaft, a thick sleeve, a taper-hole gear, a taper sleeve and a flat round nut form a rotating body;

the driving gear is engaged with the taper-hole gear, the taper sleeve is disposed in a hole of the taper-hole gear, and by tightening the flat round nut, the torque is transmitted to the driven shaft under a wedge effect of a conical contact face;

an end of a driven grooved crank is sleeved with the driven shaft and fastened on a flat face at one end of the driven shaft with a screw, and rotation torque of the driven shaft is then transmitted to the driven grooved crank;

the taper-hole gear and the taper sleeve are separated by reversely unscrewing the flat round nut, and then a phase angle between the driving grooved crank and the driven grooved crank is adjusted, namely, the driving grooved crank and the driven grooved crank are symmetrical or asymmetrical in a horizontal direction;

a kidney-shaped groove is formed in the connecting rod and has a width in clearance fit with a diameter of a section of cylindrical face at a threaded end of a short finger holder, and the short finger holder is located at a position of the kidney-shaped groove of the connecting rod, capable of rotating by an angle with respect to the connecting rod and is fixed on the connecting rod with a third nut;

a first plate spring curved finger is installed on the short finger holder and provided with a fingertip curved part used to grasp an object in a pinching manner and a middle curved part used to grasp the object in a wrapping manner;

a long finger holder has a width in clearance fit with a width of a wide kidney-shaped groove in the base plate, and a threaded section of the long finger holder penetrates through a narrow kidney-shaped groove in the base plate and is fixed with a fourth nut so that a position of the long finger holder can be adjusted in the wide and narrow kidney-shaped grooves in the base plate, and the long finger holder is also provided with a second plate spring curved finger;

the shape adjustable mechanical gripper with the crank-rocker-slider parallel mechanism is provided with a driving crank-rocker-slider mechanism on a left side and a driven crank-rocker-slider mechanism on a right side;

the short finger holder is installed on the connecting rod on the left side, the medium finger holder is correspondingly installed on a connecting rod on the right side, and the first, second, and third plate spring curved fingers on the short finger holder, the medium finger holder and the long finger holder are completely identical in structure and size;

for a structure of the mechanical gripper, planes of the short finger holder, the medium finger holder, and the long finger holder are coplanar, wherein the three plate spring curved fingers are installed on the planes;

the short finger holder and the medium finger holder are respectively installed on the driving rocker and the driven rocker;

the narrow kidney-shaped groove of the driving rocker has a width in clearance fit with the diameter of the section of cylindrical face at the threaded end of the short finger holder, the short finger holder is located at a position of the driving rocker, capable of rotating by an angle with respect to the driving rocker and fixed on the driving rocker with a fifth nut;

the medium finger holder is installed on the driven rocker;

as the driving connecting rod is higher than the driving rocker in position and the driven connecting rod is higher than the driven rocker in position, after the short finger holder is installed on the driving rocker and the medium finger holder is installed on the driven rocker, installation faces of the three plate spring curved fingers need to be supported by thick cushion blocks to make sure that the planes of the short finger holder, the medium finger holder and the long finger holder are coplanar, wherein the three plate spring curved fingers are installed on the planes;

the lead screw stepping motor is used to control positions of sliders in the crank-rocker- slider mechanisms and conducts control in cooperation with the stepping motor with the worm speed reducer used to drive cranks to rotate, so that a dual-drive parallel mechanism is formed;

a lead screw nut structure of the lead screw stepping motor and the worm speed reducer of the stepping motor with the worm speed reducer have a self-locking effect so that the two stepping motors can be powered off in a grasping process to save energy; and the stepping motor with the worm speed reducer has a higher power than the lead screw stepping motor and is mainly used to drive a clamped object.

\* \* \* \* \*